United States Patent
Kato

(10) Patent No.: US 10,501,611 B2
(45) Date of Patent: *Dec. 10, 2019

(54) DIP-FORMED ARTICLE

(71) Applicant: ZEON CORPORATION, Tokyo (JP)

(72) Inventor: Shinji Kato, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 214 days.

This patent is subject to a terminal disclaimer.

(21) Appl. No.: 15/533,303

(22) PCT Filed: Nov. 30, 2015

(86) PCT No.: PCT/JP2015/083551
§ 371 (c)(1),
(2) Date: Jun. 5, 2017

(87) PCT Pub. No.: WO2016/104058
PCT Pub. Date: Jun. 30, 2016

(65) Prior Publication Data
US 2017/0342243 A1    Nov. 30, 2017

(30) Foreign Application Priority Data

Dec. 25, 2014  (JP) ................ 2014-262869

(51) Int. Cl.
| | |
|---|---|
| *C08L 9/10* | (2006.01) |
| *B29C 41/14* | (2006.01) |
| *C08J 5/02* | (2006.01) |
| *A41D 19/00* | (2006.01) |
| *B29C 41/00* | (2006.01) |
| *B29K 7/00* | (2006.01) |
| *B29K 33/18* | (2006.01) |
| *B29K 105/00* | (2006.01) |
| *B29L 31/48* | (2006.01) |

(52) U.S. Cl.
CPC ............ *C08L 9/10* (2013.01); *A41D 19/0096* (2013.01); *B29C 41/003* (2013.01); *B29C 41/14* (2013.01); *C08J 5/02* (2013.01); *B29K 2007/00* (2013.01); *B29K 2033/18* (2013.01); *B29K 2105/0002* (2013.01); *B29L 2031/4864* (2013.01); *C08J 2309/10* (2013.01)

(58) Field of Classification Search
CPC ...... C08F 36/08; C08F 236/04; C08F 236/06; C08F 236/08; C08F 236/12; C08L 9/00; C08L 9/02; C08L 9/04; C08L 9/06; C08L 9/08; C08L 9/10
USPC ........................................................ 524/573
See application file for complete search history.

(56) References Cited

U.S. PATENT DOCUMENTS

| | | |
|---|---|---|
| 2,880,189 A | 3/1959 | Miller et al. |
| 4,102,844 A | 7/1978 | Schwinum et al. |
| 5,084,514 A | 1/1992 | Szczechura et al. |
| 5,278,234 A | 1/1994 | Nishino et al. |
| 2005/0154122 A1* | 7/2005 | Ota ........................ C08F 236/12 524/804 |
| 2005/0171272 A1 | 8/2005 | Ota et al. |
| 2010/0152365 A1 | 6/2010 | Han et al. |
| 2017/0088700 A1 | 3/2017 | Nakashima et al. |

FOREIGN PATENT DOCUMENTS

| | | |
|---|---|---|
| EP | 3124535 A1 | 2/2017 |
| JP | H05-86110 A | 4/1993 |
| JP | H05-247266 A | 9/1993 |
| JP | H06-182788 A | 7/1994 |
| WO | 2007/004459 A1 | 1/2007 |

OTHER PUBLICATIONS

Jun. 20, 2018 Extended Search Report issued in European Patent Application No. 15872627.3.
Feb. 16, 2016 Search Report issued in International Patent Application No. PCT/JP2015/083551.

* cited by examiner

*Primary Examiner* — Prashant J Khatri
*Assistant Examiner* — Zachary M Davis
(74) *Attorney, Agent, or Firm* — Oliff PLC

(57) ABSTRACT

Disclosed is a dip-formed article obtained by dip-molding a latex composition for dip-forming, which contains a crosslinking agent and a latex for dip-forming containing a copolymer composed of 40-80% by weight of conjugated diene monomer units (A) containing an isoprene unit, 20-45% by weight of ethylenically unsaturated nitrile monomer units (B), and 2-15% by weight of ethylenically unsaturated acid monomer units (C), and having a weight ratio of butadiene unit content to isoprene unit content that falls within the range of 60:40 to 100:0. Tear strength is at least 50 N/mm, tensile strength is at least 25 MPa, and oil swelling rate does not exceed 5%.

11 Claims, No Drawings

DIP-FORMED ARTICLE

TECHNICAL FIELD

The present invention relates to a dip-formed article. More specifically, the present invention relates to a dip-formed article having an excellent oil resistance, a high tensile strength, and a high tear strength.

BACKGROUND ART

A rubber glove is used in a wide range of applications such as housework, a food-related industry, a precision industry, or medical care. Conventionally, as a rubber glove having a high tensile strength and an excellent oil resistance, a dip-formed article obtained by dip-forming a carboxy-modified acrylonitrile-butadiene copolymer latex has been frequently used.

For example, Patent Literatures 1 to 7 disclose a carboxy-modified acrylonitrile-butadiene copolymer latex. A rubber glove obtained by dip-forming the latex described in these literatures has a better oil resistance than a rubber glove obtained from a natural rubber latex, and therefore has been widely used. In addition, recently, demand for a carboxy-modified acrylonitrile-butadiene copolymer latex as a synthetic rubber has been further increased because of a problem of a protein allergy caused by a protein contained in a natural rubber.

A rubber glove is required to have various characteristics, examples of which include a characteristic that the glove stretches according to movement of the finger and has a good texture in order to prevent fatigue of the hand even after being worn for a long time, a characteristic that the glove is not torn when being worn, and a characteristic that the glove is not torn even while a work touching oil and fat is performed.

However, a glove based on such a carboxy-modified acrylonitrile-butadiene copolymer as described in Patent Literatures 1 to 7 has an excellent oil resistance, but has the following problems. That is, such a copolymer has a characteristic that a balance among physical properties such as a mechanical strength (a tensile strength, a tear strength, and the like), an elongation, or a flexibility varies largely according to a monomer composition to be polymerized. Therefore, when a resulting dip-formed article is used for a rubber glove, the rubber glove may be torn while the rubber glove is worn or while a work touching oil and fat is performed.

CITATION LIST

Patent Literature

Patent Literature 1: U.S. Pat. No. 2,880,189
Patent Literature 2: U.S. Pat. No. 4,102,844
Patent Literature 3: JP 5-86110 A
Patent Literature 4: JP 5-247266 A
Patent Literature 5: JP 6-182788 A
Patent Literature 6: U.S. Pat. No. 5,084,514
Patent Literature 7: U.S. Pat. No. 5,278,234

SUMMARY OF INVENTION

Technical Problem

The present invention has been achieved in view of such circumstances, and an object thereof is to provide a dip-formed article having an excellent resistance while the dip-formed article is worn and having an excellent resistance (resistance to a mechanical maintenance work) while a work touching oil and fat is performed.

Solution to Problem

The present inventor made intensive studies in order to achieve the above object. As a result, the present inventor has found that the above object can be achieved by using a dip-formed article obtained by dip-forming a latex composition including a latex containing a copolymer containing a conjugated diene monomer unit (A), an ethylenically unsaturated nitrile monomer unit (B), and an ethylenically unsaturated acid monomer unit (C), the conjugated diene monomer unit (A) containing an isoprene unit and a butadiene unit at a specific ratio, and a crosslinking agent, the dip-formed article having a tear strength, a tensile strength, and an oil swelling ratio in a specific range, and has completed the present invention.

That is, the present invention provides:

(1) a dip-formed article obtained by dip-forming a dip-forming latex composition including a dip-forming latex containing a copolymer containing 40 to 80% by weight of conjugated diene monomer units (A) containing an isoprene unit, 20 to 45% by weight of ethylenically unsaturated nitrile monomer units (B), and 2 to 15% by weight of ethylenically unsaturated acid monomer units (C), the conjugated diene monomer units (A) containing the isoprene unit and a butadiene unit at a weight ratio of 60:40 to 100:0(isoprene unit:butadiene unit), and a crosslinking agent, the dip-formed article having a tear strength of 50 N/mm or more, a tensile strength of 25 MPa or more, and an oil swelling ratio of 5% or less;

(2) the dip-formed article described in (1), in which the ethylenically unsaturated nitrile monomer units (B) are acrylonitrile units;

(3) the dip-formed article described in (1) or (2), in which the ethylenically unsaturated acid monomer units (C) are ethylenically unsaturated monocarboxylic acid monomer units;

(4) the dip-formed article described in any one of (1) to (3), in which the ethylenically unsaturated acid monomer units (C) are methacrylic acid units;

(5) the dip-formed article described in any one of (1) to (4), in which the copolymer contains other monomer units (D) other than the conjugated diene monomer units (A), the ethylenically unsaturated nitrile monomer units (B), or the ethylenically unsaturated acid monomer units (C), and a content of the other monomer units (D) is 10% by weight or less with respect to 100% by weight of total monomer units;

(6) the dip-formed article described in any one of (1) to (5), in which the copolymer contains other monomer units (D) other than the conjugated diene monomer units (A), the ethylenically unsaturated nitrile monomer units (B), or the ethylenically unsaturated acid monomer units (C), and a content of the other monomer units (D) is 5% by weight or less with respect to 100% by weight of total monomer units;

(7) the dip-formed article described in any one of (1) to (4), in which the copolymer is formed only of the conjugated diene monomer units (A), the ethylenically unsaturated nitrile monomer units (B), and the ethylenically unsaturated acid monomer units (C);

(8) the dip-formed article described in any one of (1) to (7), in which an addition amount of the crosslinking agent in the dip-forming latex composition is from 0.01 to 5 parts by weight with respect to 100 parts by weight of a solid content in the dip-forming latex;

(9) the dip-formed article described in any one of (1) to (8), in which a solid content concentration of the dip-forming latex composition is from 5 to 40% by weight;

(10) the dip-formed article described in any one of (1) to (9), having a thickness of 0.05 to 3 mm; and (11) the dip-formed article described in any one of (1) to (10), obtained by an anode coagulant dipping method.

Advantageous Effects of Invention

The present invention can provide a dip-formed article having an excellent resistance while the dip-formed article is worn and having an excellent resistance to a mechanical maintenance work.

DESCRIPTION OF EMBODIMENTS

Hereinafter, a dip-formed article of the present invention will be described. The dip-formed article of the present invention is obtained by dip-forming a dip-forming latex composition including a dip-forming latex containing a copolymer containing 40 to 80% by weight of conjugated diene monomer units (A) containing an isoprene unit, 20 to 45% by weight of ethylenically unsaturated nitrile monomer units (B), and 2 to 15% by weight of ethylenically unsaturated acid monomer units (C), the conjugated diene monomer units (A) containing the isoprene unit and a butadiene unit at a weight ratio of 60:40 to 100:0 (isoprene unit: butadiene unit), and a crosslinking agent, the dip-formed article having a tear strength of 50 N/mm or more, a tensile strength of 25 MPa or more, and an oil swelling ratio of 5% or less.

(Dip-forming Latex)

The dip-forming latex used in the present invention contains a copolymer containing 40 to 80% by weight of the conjugated diene monomer units (A) containing an isoprene unit, 20 to 45% by weight of the ethylenically unsaturated nitrile monomer units (B), and 2 to 15% by weight of the ethylenically unsaturated acid monomer units (C), the conjugated diene monomer units (A) containing the isoprene unit and a butadiene unit at a weight ratio of 60:40 to 100:0 (isoprene unit:butadiene unit).

The content of the conjugated diene monomer units (A) in the copolymer constituting the latex is from 40 to 80% by weight, preferably from 50 to 75% by weight, and more preferably from 55 to 70% by weight with respect to the total monomer units of the copolymer. When this ratio is small, the texture is poor. On the contrary, when this ratio is large, the tensile strength is lowered.

The conjugated diene monomer units (A) contain at least an isoprene unit, and may further contain a butadiene unit. The total content of an isoprene unit and a butadiene unit with respect to the total amount of the conjugated diene monomer units (A) is preferably 90% by weight or more. Further, the conjugated diene monomer units (A) are particularly preferably constituted substantially only of an isoprene unit or substantially only of an isoprene unit and a butadiene unit.

Note that, the content of an isoprene unit is preferably from 40 to 100% by weight, and the content of a butadiene unit is preferably from 0 to 30% by weight with respect to the total amount of the conjugated diene monomer units (A). In addition, 1,3-butadiene is preferable as a monomer to form a butadiene unit.

A content ratio by weight between an isoprene unit and a butadiene unit (isoprene unit:butadiene unit) in the conjugated diene monomer units (A) is from 60:40 to 100:0, and preferably from 70:30 to 100:0. When the ratio of a butadiene unit is too large, the tear strength is insufficient, and a dip-formed article is easily torn while a work touching oil and fat is performed.

The conjugated diene monomer units (A) may contain a conjugated diene monomer unit other than an isoprene unit or a butadiene unit. A conjugated diene monomer (a) to form such another conjugated diene monomer unit is not particularly limited, but examples thereof include a conjugated diene monomer having 4 to 12 carbon atoms other than butadiene or isoprene, such as 2,3-dimethyl-1,3-butadiene, 2-ethyl-1,3 butadiene, 1,3-pentadiene, or chloroprene. However, the content of a conjugated diene monomer unit other than an isoprene unit or a butadiene unit is preferably 10% by weight or less with respect to the total amount of the conjugated diene monomer units (A).

As an ethylenically unsaturated nitrile monomer (b) to form the ethylenically unsaturated nitrile monomer units (B), an ethylenically unsaturated compound having a nitrile group and 3 to 18 carbon atoms is used. Examples of such a compound include acrylonitrile, methacrylonitrile, and halogen-substituted acrylonitrile. These compounds can be used singly or in combination of two or more kinds thereof. Among the above compounds, acrylonitrile can be preferably used.

The content of the ethylenically unsaturated nitrile monomer units (B) in the copolymer constituting the latex is from 20 to 45% by weight, preferably from 20 to 40% by weight, and more preferably from 20 to 30% by weight with respect to the total monomer units of the copolymer. When the content of the ethylenically unsaturated nitrile monomer units (B) is too small, the tensile strength and the oil resistance are poor. On the contrary, when this content is large, the texture is poor.

An ethylenically unsaturated acid monomer (c) to form the ethylenically unsaturated acid monomer units (C) is not particularly limited. However, examples thereof include a carboxyl group-containing ethylenically unsaturated monomer, a sulfonic acid group-containing ethylenically unsaturated monomer, and a phosphate group-containing ethylenically unsaturated monomer.

Examples of the carboxyl group-containing ethylenically unsaturated monomer include an ethylenically unsaturated monocarboxylic acid such as acrylic acid, methacrylic acid, or crotonic acid; an ethylenically unsaturated polycarboxylic acid and an anhydride thereof, such as fumaric acid, maleic acid, itaconic acid, maleic anhydride, or itaconic anhydride; and a partially-esterified product of an ethylenically unsaturated polycarboxylic acid, such as methyl maleate or methyl itaconate.

Examples of the sulfonic acid group-containing ethylenically unsaturated monomer include vinyl sulfonic acid, methyl vinyl sulfonic acid, styrene sulfonic acid, (meth)allylsulfonic acid, (meth)acrylic acid-2-ethyl sulfonate, and 2-acrylamide-2-hydroxypropane sulfonic acid.

Examples of the phosphate group-containing ethylenically unsaturated monomer include (meth)acrylic acid-3-chloro-2-propyl phosphate, (meth)acrylic acid-2-ethyl phosphate, and 3-allyloxy-2-hydroxy propane phosphoric acid.

These ethylenically unsaturated acid monomers (c) can be used also in a form of an alkali metal salt or an ammonium salt thereof, and can be used singly or in combination of two or more kinds thereof. Among the above ethylenically unsaturated acid monomers (c), a carboxyl group-containing ethylenically unsaturated monomer can be preferably used, an ethylenically unsaturated monocarboxylic acid can be more preferably used, and methacrylic acid can be particularly preferably used.

The content of the ethylenically unsaturated acid monomer units (C) in the copolymer constituting the latex is from 2 to 15% by weight, preferably from 3 to 12% by weight, and more preferably from 4 to 10% by weight with respect to the total monomer units of the copolymer. When the content of the ethylenically unsaturated acid monomer units (C) is too small, the tensile strength is poor. On the contrary, when this content is too large, the texture is poor.

The copolymer constituting the latex may contain other monomer units (D) which are monomer units other than the conjugated diene monomer units (A), the ethylenically unsaturated nitrile monomer units (B), or the ethylenically unsaturated acid monomer units (C).

A monomer (d) to form the other monomer units (D) is not particularly limited as long as being a monomer copolymerizable with the conjugated diene monomer (a), the ethylenically unsaturated nitrile monomer (b), and the ethylenically unsaturated acid monomer (c). Examples thereof include the following monomers.

That is, examples thereof include an aromatic vinyl monomer such as styrene, α-methyl styrene, monochloro styrene, dichloro styrene, trichloro styrene, monomethyl styrene, dimethyl styrene, trimethyl styrene, or hydroxymethyl styrene; an ethylenically unsaturated carboxylic acid amide monomer such as acrylamide, methacrylamide, N,N-dimethyl acrylamide, or N-methylol acrylamide; an ethylenically unsaturated alkyl carboxylate monomer such as methyl (meth)acrylate, ethyl (meth)acrylate, butyl (meth)acrylate, or 2-ethylhexyl (meth)acrylate; a vinyl carboxylate monomer such as vinyl acetate, vinyl propionate, or vinyl versatate; a vinyl halide monomer such as vinyl chloride, vinylidene chloride, vinyl fluoride, or vinylidene fluoride; an olefin monomer such as ethylene, propylene, 1-butene, or isobutene;

a vinyl ether monomer such as methyl vinyl ether, n-propyl vinyl ether, isobutyl vinyl ether, or dodecyl vinyl ether; a (meth)allyl compound such as allyl acetate, methallyl acetate, allyl chloride, or methallyl chloride; a vinyl silyl compound such as vinyl trimethoxy silane; vinyl pyridine; and N-vinylpyrrolidone. These compounds can be used singly or in combination of two or more kinds thereof.

Among these compounds, an aromatic vinyl monomer is preferable because of increasing a tensile strength of a dip-formed article. The content of the other monomer units (D) in the copolymer constituting the latex is preferably 10% by weight or less, more preferably 7% by weight or less, and still more preferably 5% by weight or less with respect to the total monomer units in the copolymer from a viewpoint of maintaining a tensile strength, an oil resistance, and a texture favorably.

Note that, particularly preferably, the present invention does not contain the other monomer units (D) substantially. That is, the copolymer constituting the latex is particularly preferably formed only of the conjugated diene monomer units (A), the ethylenically unsaturated nitrile monomer units (B), and the ethylenically unsaturated acid monomer units (C).

(Method for Manufacturing Dip-forming Latex)

The dip-forming latex used in the present invention is not particularly limited, but can be easily manufactured by subjecting a mixture of the above monomers to emulsion polymerization. By adjusting the composition of a monomer mixture used for emulsion polymerization, the composition of a resulting copolymer can be adjusted easily. As an emulsion polymerization method, a conventionally known emulsion polymerization method may be employed. Further, in emulsion polymerization, a polymerization auxiliary material usually used, such as an emulsifier, a polymerization initiator, or a molecular weight adjusting agent can be used.

The emulsifier is not particularly limited, but examples thereof include an anionic surfactant, a nonionic surfactant, a cationic surfactant, and an amphoteric surfactant. Among these surfactants, an anionic surfactant such as an alkylbenzene sulfonate, an aliphatic sulfonate, a sulfate of a higher alcohol, an α-olefin sulfonate, or an alkyl ether sulfate can be preferably used. The use amount of an emulsifier is preferably from 0.5 to 10 parts by weight, and more preferably from 1 to 8 parts by weight with respect to 100 parts by weight of all the monomers.

The polymerization initiator is not particularly limited, but a radical initiator can be preferably used. Examples of such a radical initiator include an inorganic peroxide such as sodium persulfate, potassium persulfate, ammonium persulfate, potassium perphosphate, or hydrogen peroxide; an organic peroxide such as t-butyl peroxide, cumene hydroperoxide, p-menthane hydroperoxide, di-t-butyl peroxide, t-butyl cumyl peroxide, acetyl peroxide, isobutyryl peroxide, octanoyl peroxide, dibenzoyl peroxide, 3,5,5-trimethyl hexanoyl peroxide, or t-butyl peroxy isobutyrate; and an azo compound such as azobisisobutyronitrile, azobis-2,4-dimethylvaleronitrile, azobiscyclohexane carbonitrile, or azobis (isobutyric acid methyl). These polymerization initiators can be used singly or in combination of two or more kinds thereof. Among these radical initiators, an inorganic or organic peroxide can be preferably used, an inorganic peroxide can be more preferably used, and a persulfate can be particularly preferably used. The use amount of a polymerization initiator is preferably from 0.01 to 2 parts by weight, and more preferably from 0.05 to 1.5 parts by weight with respect to 100 parts by weight of all the monomers.

The molecular weight adjusting agent is not particularly limited. However, examples thereof include α-methylstyrene dimer; mercaptans such as t-dodecyl mercaptan, n-dodecyl mercaptan, or octyl mercaptan; a halogenated hydrocarbon such as carbon tetrachloride, methylene chloride, or methylene bromide; and a sulfur-containing compound such as tetraethyl thiuram disulfide, dipentamethylene thiuram disulfide, or diisopropyl xanthogen disulfide. These compounds can be used singly or in combination of two or more kinds thereof. Among these compounds, mercaptans can be preferably used, and t-dodecyl mercaptan can be more preferably used. The use amount of a molecular weight adjusting agent depends on the kind thereof, but is preferably from 0.1 to 0.8 parts by weight, and more preferably from 0.2 to 0.7 parts by weight with respect to 100 parts by weight of all the monomers.

Emulsion polymerization is usually performed in water. The use amount of water is preferably from 80 to 500 parts by weight, and more preferably from 100 to 200 parts by weight with respect to 100 parts by weight of all the monomers.

In emulsion polymerization, a polymerization auxiliary material other than the above compounds may be used, as necessary. Examples of such a polymerization auxiliary material include a chelating agent, a dispersing agent, a pH adjusting agent, an oxygen scavenger, and a particle diameter adjusting agent. The kind or the use amount thereof is not particularly limited.

The polymerization temperature is not particularly limited, but is usually from 0 to 95° C., and preferably from 5 to 70° C. By adding a polymerization inhibitor to stop a polymerization reaction, then removing an unreacted monomer if desired, and adjusting the solid content concentration or the pH, the dip-forming latex used in the present invention can be obtained. A polymerization conversion ratio at the time of stopping the polymerization reaction is usually 80% by weight or more, and preferably 90% by weight.

The weight average particle diameter of copolymer particles constituting the dip-forming latex used in the present invention is usually from 30 to 1000 nm, preferably from 50 to 500 nm, and more preferably from 70 to 200 nm. When this particle diameter is too small, the viscosity of the latex is too high, and it is difficult to handle the latex. On the contrary, when the particle diameter is too large, film formability at the time of dip-forming is lowered, and it is difficult to obtain a dip-formed article having a uniform film thickness.

The total solid content concentration of the dip-forming latex used in the present invention is usually from 20 to 65% by weight, preferably from 30 to 60% by weight, and more preferably from 35 to 55% by weight. When this concentration is too low, a transport efficiency of the latex is reduced. On the contrary, when the concentration is too high, it is difficult to manufacture the latex, the viscosity of the latex is too high, and it is difficult to handle the latex.

The pH of the dip-forming latex used in the present invention is usually from 5 to 13, preferably from 7 to 10, and more preferably from 7.5 to 9. When the pH of the latex is too low, mechanical stability is lowered, and coarse aggregates are easily generated during transportation of the latex disadvantageously. On the contrary, when the pH is too high, the viscosity of the latex is too high, and it is difficult to handle the latex.

Various additives usually added to a latex, such as an anti-aging agent, an antioxidant, a preservative, an antibacterial agent, a thickener, a dispersing agent, a pigment, or a dye can be added in a predetermined amount to the dip-forming latex used in the present invention, if desired.

(Dip-forming Latex Composition)

The dip-forming latex composition used in the present invention contains the above dip-forming latex and a crosslinking agent, and is preferably obtained by adding a crosslinking agent to the above dip-forming latex. A composition capable of being dip-formed can be obtained by adding a crosslinking agent.

As the crosslinking agent, an agent usually used in dip-forming can be used, and is not particularly limited. However, for example, an organic peroxide or a sulfur crosslinking agent can be used.

Examples of the organic peroxide include dibenzoyl peroxide, benzoyl (3-methylbenzoyl) peroxide, di(4-methylbenzoyl) peroxide, dilauroyl peroxide, distearoyl peroxide, di-α-cumyl peroxide, 1,1-bis(t-butylperoxy) cyclododecane, succinic acid peroxide, bis(4-t-butylcyclohexyl) peroxy dicarbonate, and t-butyl peroxy maleic acid. These compounds can be used singly or in combination of two or more kinds thereof. Among these organic peroxides, dibenzoyl peroxide and dilauroyl peroxide can be preferably used, and dibenzoyl peroxide can be more preferably used because of obtaining a dip-formed article having an excellent balance among physical properties.

Examples of the sulfur crosslinking agent include sulfur such as powdered sulfur, flowers of sulfur, precipitated sulfur, colloidal sulfur, surface-treated sulfur, or insoluble sulfur; and a sulfur-containing compound such as sulfur chloride, sulfur dichloride, morpholine disulfide, alkylphenol disulfide, dibenzothiazyl disulfide, N,N'-dithio-bis(hexahydro-2H-azenopine-2), phosphorus-containing polysulfide, or polymer polysulfide; and a sulfur-donating compound such as tetramethylthiuram disulfide, selenium dimethyldithiocarbamate, or 2-(4'-morpholinodithio) benzothiazole. These compounds may be used singly or in combination of a plurality of kinds thereof.

The addition amount of a crosslinking agent is preferably from 0.01 to 5 parts by weight, more preferably from 0.05 to 3 parts by weight, and particularly preferably from 0.1 to 2 parts by weight with respect to 100 parts by weight of the total solid content in the dip-forming latex. When the addition amount of a crosslinking agent is too small, the tensile strength tends to be poor. When the addition amount of a crosslinking agent is too large, the texture and the tensile strength tend to be poor.

When a sulfur crosslinking agent is used as a crosslinking agent, the sulfur crosslinking agent is preferably added as an aqueous dispersion in which the sulfur crosslinking agent is dispersed in water. By adding a sulfur crosslinking agent as an aqueous dispersion, a dip-formed article such as a glove having less defects of generation of a pinhole, attachment of aggregates, and the like, and having a high tensile strength and a high tear strength can be obtained. On the other hand, when a sulfur crosslinking agent is not added as an aqueous dispersion, not only the tensile strength or the tear strength is lowered, but also aggregates will be generated, and therefore there is a possibility that it is impossible to obtain a glove satisfactory as a protection.

A method for preparing a dispersion of a sulfur crosslinking agent is not particularly limited, but a method for adding a medium to a sulfur crosslinking agent, and grinding and stirring the resulting dispersion with a wet grinding machine such as a ball mill or a bead mill is preferable.

When sulfur is used as a crosslinking agent, a crosslinking accelerator (vulcanization accelerator) or zinc oxide is preferably blended.

As a crosslinking accelerator (vulcanization accelerator), an accelerator usually used in dip-forming can be used. Examples thereof include dithiocarbamic acids such as diethyldithiocarbamic acid, dibutyldithiocarbamic acid, di-2-ethylhexyl dithiocarbamic acid, dicyclohexyl dithiocarbamic acid, diphenyl dithiocarbamic acid, or dibenzyl dithiocarbamic acid, and zinc salts thereof; 2-mercaptobenzothiazole, zinc 2-mercaptobenzothiazole, 2-mercaptothiazoline, dibenzothiazyl disulfide, 2-(2,4-dinitrophenylthio) benzothiazole, 2-(N,N-diethylthio carbaylthio) benzothiazole, 2-(2,6-dimethyl-4-morpholinothio) benzothiazole, 2-(4'-morpholino dithio) benzothiazole, 4-morphonilyl-2-benzothiazyl disulfide, and 1,3-bis(2-benzothiazyl mercaptomethyl) urea. However, zinc diethyldithiocarbamate, zinc dibutyldithiocarbamate, 2-mercaptobenzothiazole, and zinc 2-mercaptobenzothiazole are preferable. These crosslinking accelerators may be used singly or in combination of two or more kinds thereof. The use amount of a crosslinking accelerator is from 0.1 to 10 parts by weight, and preferably from 0.5 to 5 parts by weight with respect to 100 parts by weight of the total solid content in the dip-forming latex.

Further, the use amount of zinc oxide is 5 parts by weight or less, preferably from 0.1 to 3 parts by weight, and more preferably from 0.5 to 2 parts by weight with respect to 100 parts by weight of the total solid content in the dip-forming latex.

Various additives such as an anti-aging agent, an antioxidant, a preservative, an antibacterial agent, a wetting agent, a thickener, a dispersing agent, a pigment, a dye, a filler, a reinforcing material, or a pH adjusting agent can be added in a predetermined amount to the dip-forming latex composition used in the present invention, as necessary.

The solid content concentration of the dip-forming latex composition is preferably from 5 to 40% by weight, and more preferably from 10 to 25% by weight. The pH of the dip-forming latex composition is preferably from 8.5 to 12, and more preferably from 9 to 11.

(Aging)

The dip-forming latex composition in the present invention may be subjected to aging (also referred to as pre-vulcanization) before being subjected to dip-forming.

When an organic peroxide is used as a crosslinking agent, the temperature for aging and the aging time are not particularly limited. However, aging is preferably performed at 20 to 30° C. for several hours to 10 hours.

When a sulfur crosslinking agent is used as a crosslinking agent, the temperature for aging is preferably from 20 to 30° C. In addition, time for aging is preferably 12 hours or more, and more preferably 24 hours or more from a viewpoint of obtaining a dip-formed article such as a glove having a high tensile strength and a high tear strength. When this time is too short, the tensile strength or the tear strength of the resulting dip-formed article is lowered.

The resulting product is preferably stored at a temperature of 10° C. to 30° C. after being subjected to pre-vulcanization and before being subjected to dip-forming. When the product is stored at a high temperature, the tensile strength of a resulting dip-formed article tends to be lowered.

(Dip-formed Article)

The dip-formed article of the present invention is obtained by dip-forming the above dip-forming latex composition. As a dip-forming method, a conventionally known method can be employed, and examples thereof include a direct dipping method, an anode coagulant dipping method, and a Teague coagulant dipping method. Among these methods, the anode coagulant dipping method is preferable because of easily obtaining a dip-formed article having a uniform thickness. Hereinafter, a dip-forming method using the anode coagulant dipping method according to one embodiment will be described.

First, by dipping a dip-forming mold in a coagulating agent solution, the coagulating agent is attached to a surface of the dip-forming mold.

As the dip-forming mold, various molds made of porcelain, glass, metal, a plastic, and the like can be used. The shape of the mold may be formed so as to match the shape of a dip-formed article as a final product. For example, when the dip-formed article is a glove, the shape of the dip-forming mold can be various shapes such as a shape from the wrist to the fingertips or a shape from the elbow to the fingertips. In addition, the entire portion or a portion of a surface of the dip-forming mold may have been subjected to surface processing such as gloss processing, semi-gloss processing, non-gloss processing, or weaving pattern processing.

A coagulating agent solution is obtained by dissolving a coagulating agent capable of coagulating latex particles in water, alcohol, or a mixture thereof. Examples of the coagulating agent include a metal halide, a nitrate, and a sulfate.

Subsequently, the dip-forming mold to which a coagulating agent has been attached is dipped in the above dip-forming latex composition, and then the dip-forming mold is pulled up to form a dip-formed layer on a surface of the dip-forming mold.

Subsequently, the dip-formed layer formed on the dip-forming mold is heated to perform crosslinking of a copolymer constituting the dip-formed layer.

The heating temperature for crosslinking is preferably from 60 to 160° C., and more preferably from 80 to 150° C. When the heating temperature is too low, it takes a long time for a crosslinking reaction, and therefore productivity may be reduced. When the heating temperature is too high, oxidation deterioration of the copolymer is promoted, and physical properties of a formed article may be lowered. The time for the heat treatment may be selected as appropriate depending on the temperature for the heat treatment, but is usually from 5 to 120 minutes.

In the present invention, before the dip-formed layer is subjected to the heat treatment, water-soluble impurities (an emulsifier, a water-soluble polymer, a coagulating agent, or the like) are preferably removed by dipping the dip-formed layer in warm water at 20 to 80° C. for about 0.5 to 60 minutes.

Subsequently, the dip-formed layer which has been crosslinked by the heat treatment is removed from the dip-forming mold to obtain a dip-formed article. Examples of a method for removing a mold include a method for peeling the dip-formed layer from the forming mold with the hand and a method for peeling the dip-formed layer with a water pressure or a pressure of compressed air.

After removal from the mold, the dip-formed article may be further subjected to a heat treatment (post-crosslinking step) at a temperature of 60 to 120° C. for 10 to 120 minutes. A surface-treated layer may be further formed on an inner surface and/or an outer surface of the dip-formed article by a chlorination treatment, a coating treatment, and the like.

Further, the dip-formed article of the present invention may include a coating object (to be dip-formed) by using the coating object in place of the above dip-forming mold. Note that, the above step for removing a mold is not necessary in this case.

The tear strength of the dip-formed article of the present invention is 50 N/mm or more, and preferably 60 N/mm or more. Here, the tear strength of the dip-formed article can be measured based on ASTM D624-00. When the tear strength of the dip-formed article is too small, the dip-formed article may be torn while a work touching oil and fat is performed.

Further, the tensile strength of the dip-formed article of the present invention is 25 MPa or more, and preferably 30 MPa or more. Here, the tensile strength of the dip-formed article can be measured based on ASTM D624-00. When the tensile strength of the dip-formed article is too small, the dip-formed article may be torn while the dip-formed article is worn or while a work touching oil and fat is performed.

Further, the oil swelling ratio of the dip-formed article of the present invention is 5% or less, preferably 3.5% or less, and more preferably 2% or less. Here, the oil swelling ratio in the present invention can be determined using an area of a test piece of the dip-formed article before the test piece is dipped in a predetermined test oil and an area thereof after the test piece is dipped therein. Specifically, the oil swelling ratio can be expressed by a value obtained by dividing a change in the area between before and after dipping in the test oil by the area before dipping (area swelling rate). In the present invention, the oil swelling ratio of the dip-formed article is a value obtained using IRM903 as a test oil. When the oil swelling ratio of the dip-formed article is too large, the dip-formed article may be torn while the dip-formed article is worn or while a work touching oil and fat is performed.

The dip-formed article of the present invention usually has a thickness of 0.05 to 3 mm. The dip-formed article of the present invention has an excellent oil resistance, a good texture, a high tensile strength, and a high tear strength.

Therefore, the dip-formed article of the present invention can be suitably used for a medical article such as a nipple for a baby bottle, a dropper, a conduit, or a water pillow; a toy and an exercise tool such as a balloon, a doll, or a ball; an industrial product such as a pressure forming bag or a gas storage bag; a surgical glove, a household glove, an agricultural glove, a fishery glove, and an industrial glove; a finger sack; and the like. Note that, a glove may be a supported type or an unsupported type when the formed article is the glove.

EXAMPLES

Hereinafter, the present invention will be described specifically based on Examples and Comparative Examples. The "part" and "%" in Examples and Comparative Examples are based on a weight, unless otherwise specified. However, the present invention is not limited only to Examples. Measurement and evaluation in Examples and Comparative Examples were performed as follows.

(Measurement of Tensile Strength)

Test pieces with a dumbbell shape were prepared using a dumbbell (SDMK-100C: manufactured by Dumbbell Co., Ltd.) from rubber gloves obtained in Examples and Comparative Examples in accordance with ASTM D-412. Subsequently, the test pieces were pulled at a tensile rate of 500 ram/min, and the tensile strength at break (MPa) was measured. A higher tensile strength is more preferable.

(Measurement of Tear Strength)

The tear strength was measured based on ASTM D624-00. Specifically, the test pieces were prepared by punching rubber gloves obtained in Examples and Comparative Examples with a dumbbell (SDMK-1000C: manufactured by Dumbbell Co., Ltd.). The test pieces were stretched with a Tensilon universal testing machine (product name "RTC-1225A", manufactured by Orientec Co., Ltd.) at a tensile speed of 500 ram/min to measure a tear strength (unit: N/mm).

(Oil Resistance Dipping Test (measurement of IRM903Oil Swelling Ratio))

Rubber gloves as dip-formed articles, obtained in Examples and Comparative Example were punched into circles each having a diameter of 20 mm to be used as test pieces. These test pieces were dipped in a predetermined test oil (IRM903) for 24 hours, and then areas thereof were measured. A value obtained by dividing a change in the area between before and after dipping in the test oil by the area before dipping (area swelling rate) was determined to be used as an index of an oil resistance.

(Resistance When Being Worn)

Rubber gloves as dip-formed articles, obtained in Examples and Comparative Example were actually worn, and resistance thereof was evaluated. The gloves were worn by the same person on the same day. When the gloves were worn, an end of a hand insertion portion of each of the gloves was held by the hand which did not wear the glove, and the portion was pulled up to the elbow for wearing. 10 pieces of the same sample were each worn and evaluated based on the following criteria.

A: No glove was torn.
B: One or two gloves were torn.
C: Three to five gloves were torn.
D: Six or more gloves were torn.

(Resistance to Mechanical Maintenance Work)

Rubber gloves as dip-formed articles, obtained in Examples and Comparative Example were actually worn, a mechanical maintenance work was performed for four hours, and resistance was evaluated based on the following criteria. Note that, the mechanical maintenance work specifically means disassembly, cleaning, oil feeding, and assembly of a machine using a tool. Five pieces of the same sample were each tested, and tearing time was calculated as an average value of tearing time for five pieces.

A: not torn for three hours or more
B: torn in two hours or more and less than three hours
C: torn in one hour or more and less than two hours
D: torn in less than one hour

Example 1

(Manufacturing Dip-forming Latex)

45.5 parts of isoprene, 19.5 parts of 1,3-butadiene, 29.0 parts of acrylonitrile, 6.0 parts of methacrylic acid, 0.4 parts of t-dodecyl mercaptan, 132 parts of ion-exchanged water, 3 parts of sodium dodecylbenzenesulfonate, 0.5 parts of a sodium salt of β-naphthalenesulfonic acid formalin condensate, 0.3 parts of potassium persulfate, and 0.05 parts of ethylenediamine sodium tetraacetate were put into a polymerization reactor. Polymerization was performed while the polymerization temperature was maintained at 30 to 40° C., and a reaction was performed until the polymerization conversion ratio reached 94%.

An unreacted monomer was removed from the resulting copolymer latex. Thereafter, the pH of the copolymer latex and the solid content concentration thereof were adjusted to obtain a dip-forming latex having a solid content concentration of 40% and a pH of 8 in Example 1.

(Preparation of Sulfur Dispersion)

In a ball mill, 1.0 part of colloidal sulfur (Hosoi Chemical Industry Co., Ltd.), 0.5 parts of a dispersing agent (Demol N manufactured by Kao Corporation), 0.0015 parts of 5% potassium hydroxide (Wako Pure Chemical Industries, Ltd.), and 1.0 part of water were ground and stirred for 48 hours to obtain a sulfur dispersion having a solid content concentration of 50% by weight.

(Preparation of Dip-forming Latex Composition)

By adding a 5% aqueous potassium hydroxide solution to the above dip-forming latex, the pH was adjusted to 10.0. In addition, aqueous dispersions of compounding agents were added thereto such that the content of colloidal sulfur (added as the above sulfur dispersion) was 1.0 part, the content of zinc dibutyldithiocarbamate was 0.5 parts, and the content of zinc oxide was 1.5 parts in terms of a solid content with respect to 100 parts of the copolymer in the dip-forming latex. Note that during addition, an aqueous dispersion of each compounding agent was added slowly in a predetermined amount while the latex was stirred.

Subsequently, the solid content concentration was adjusted to 20% by further adding ion-exchanged water. Thereafter, the resulting product was aged by stirring the product to such an extent that a liquid surface thereof slowly flowed at a temperature of 30° C. for 24 hours to prepare a dip-forming latex composition.

(Manufacturing Dip-formed Article (Rubber Glove))

A dip-formed article (rubber glove) was manufactured by the following method using the above dip-forming latex composition.

First, by mixing 18 parts of calcium nitrate, 0.05 parts of polyethylene glycol octylphenyl ether as a nonionic emulsifier, and 82 parts of water, a coagulating agent aqueous solution was prepared. Subsequently, a glove mold was dipped in this coagulating agent aqueous solution for 5 seconds, and was pulled up. Thereafter, the glove mold was dried at a temperature of 50° C. for 10 minutes, and the coagulating agent was attached to the glove mold. The glove mold to which the coagulating agent had been attached was dipped in the above dip-forming latex composition for 6 seconds, and was pulled up. Thereafter, the glove mold was dried at a temperature of 50° C. for 10 minutes, and a dip-formed layer was formed on a surface of the glove mold.

Thereafter, the glove mold was dipped in warm water at 50° C. for 2 minutes to cause water-soluble impurities to be eluted, and was dried at a temperature of 70° C. for 10 minutes. Subsequently, the glove mold was subjected to a heat treatment at a temperature of 120° C. for 20 minutes to crosslink the dip-formed layer.

Subsequently, the crosslinked dip-formed layer was peeled from the glove mold to obtain a rubber glove having a thickness of 0.07 mm. The resulting rubber glove was measured for the tensile strength and the tear strength, was subjected to an oil resistance dipping test, and was evaluated for a resistance when being worn and a resistance to a mechanical maintenance work. Table 1 indicates results thereof.

Example 2

A dip-forming latex was manufactured in a similar manner to Example 1 except that the amount of isoprene was changed to 52.0 parts and the amount of 1,3-butadiene was changed to 13.0 parts in manufacturing the dip-forming latex. A dip-forming latex composition was prepared and a dip-formed article (rubber glove) was manufactured in a similar manner to Example 1 except that the dip-forming latex obtained in this manner was used. The resulting rubber glove was measured for a tensile strength and a tear strength, was subjected to an oil resistance dipping test, and was evaluated for a resistance when being worn and a resistance to a mechanical maintenance work. Table 1 indicates results thereof.

Example 3

A dip-forming latex was manufactured in a similar manner to Example 1 except that the amount of isoprene was changed to 61.75 parts and the amount of 1,3-butadiene was changed to 3.25 parts in manufacturing the dip-forming latex. A dip-forming latex composition was prepared and a dip-formed article (rubber glove) was manufactured in a similar manner to Example 1 except that the dip-forming latex obtained in this manner was used. The resulting rubber glove was measured for a tensile strength and a tear strength, was subjected to an oil resistance dipping test, and was evaluated for a resistance when being worn and a resistance to a mechanical maintenance work. Table 1 indicates results thereof.

Example 4

A dip-forming latex was manufactured in a similar manner to Example 1 except that the amount of isoprene was changed to 65.0 parts and 1,3-butadiene was not used in manufacturing the dip-forming latex. A dip-forming latex composition was prepared and a dip-formed article (rubber glove) was manufactured in a similar manner to Example 1 except that the dip-forming latex obtained in this manner was used. The resulting rubber glove was measured for a tensile strength and a tear strength, was subjected to an oil resistance dipping test, and was evaluated for a resistance when being worn and a resistance to a mechanical maintenance work. Table 1 indicates results thereof.

Example 5

A dip-forming latex was manufactured in a similar manner to Example 1 except that the amount of isoprene was changed to 55.2 parts, the amount of 1,3-butadiene was changed to 13.8 parts, and the amount of acrylonitrile was changed to 25.0 parts in manufacturing the dip-forming latex. A dip-forming latex composition was prepared and a dip-formed article (rubber glove) was manufactured in a similar manner to Example 1 except that the dip-forming latex obtained in this manner was used. The resulting rubber glove was measured for a tensile strength and a tear strength, was subjected to an oil resistance dipping test, and was evaluated for a resistance when being worn and a resistance to a mechanical maintenance work. Table 1 indicates results thereof.

Example 6

A dip-forming latex was manufactured in a similar manner to Example 1 except that the amount of isoprene was changed to 52.8 parts, the amount of 1,3-butadiene was changed to 13.2 parts, and the amount of methacrylic acid was changed to 5.0 parts in manufacturing the dip-forming latex. A dip-forming latex composition was prepared and a dip-formed article (rubber glove) was manufactured in a similar manner to Example 1 except that the dip-forming latex obtained in this manner was used. The resulting rubber glove was measured for a tensile strength and a tear strength, was subjected to an oil resistance dipping test, and was evaluated for a resistance when being worn and a resistance to a mechanical maintenance work. Table 1 indicates results thereof.

Comparative Example 1

A dip-forming latex was manufactured in a similar manner to Example 1 except that the amount of isoprene was changed to 32.5 parts and the amount of 1,3-butadiene was changed to 32.5 parts in manufacturing the dip-forming latex. A dip-forming latex composition was prepared and a dip-formed article (rubber glove) was manufactured in a similar manner to Example 1 except that the dip-forming latex obtained in this manner was used. The resulting rubber glove was measured for a tensile strength and a tear strength, was subjected to an oil resistance dipping test, and was evaluated for a resistance when being worn and a resistance to a mechanical maintenance work. Table 1 indicates results thereof.

Comparative Example 2

A dip-forming latex was manufactured in a similar manner to Example 1 except that the amount of 1,3-butadiene was changed to 65.0 parts and isoprene was not used in manufacturing the dip-forming latex. A dip-forming latex composition was prepared and a dip-formed article (rubber glove) was manufactured in a similar manner to Example 1 except that the dip-forming latex obtained in this manner was used. The resulting rubber glove was measured for a tensile strength and a tear strength, was subjected to an oil resistance dipping test, and was evaluated for a resistance when being worn and a resistance to a mechanical maintenance work. Table 1 indicates results thereof.

Comparative Example 3

A dip-forming latex was manufactured in a similar manner to Example 1 except that the amount of isoprene was changed to 67.2 parts, the amount of 1,3-butadiene was changed to 16.8 parts, and the amount of acrylonitrile was changed to 10.0 parts in manufacturing the dip-forming latex. A dip-forming latex composition was prepared and a dip-formed article (rubber glove) was manufactured in a similar manner to Example 1 except that the dip-forming latex obtained in this manner was used. The resulting rubber glove was measured for a tensile strength and a tear strength, was subjected to an oil resistance dipping test, and was evaluated for a resistance when being worn and a resistance to a mechanical maintenance work. Table 1 indicates results thereof.

Comparative Example 4

A dip-forming latex composition was prepared and a dip-formed article (rubber glove) was manufactured in a similar manner to Example 1 except that a mixture of the dip-forming latex manufactured in Example 4 and the dip-forming latex manufactured in Comparative Example 2 at a weight ratio of 80:20 was used. The resulting rubber glove was measured for a tensile strength and a tear strength, was subjected to an oil resistance dipping test, and was evaluated for a resistance when being worn and a resistance to a mechanical maintenance work. Table 1 indicates results thereof.

when being worn and an excellent resistance to a mechanical maintenance work (Examples 1 to 6).

On the other hand, when the content ratio of an isoprene unit is small and the tear strength is small, the resistance to a mechanical maintenance work is poor (Comparative Examples 1 and 2).

Further, when the content ratio of the ethylenically unsaturated nitrile monomer units (B) is small, the tensile strength is small, and the IRM903 oil swelling ratio is high, the resistance when being worn and the resistance to a mechanical maintenance work are poor (Comparative Example 3).

Also, when the tear strength and the tensile strength of the dip-forming latex composition are small and the IRM903 oil swelling ratio is high, the resistance when being worn and the resistance to a mechanical maintenance work are significantly poor (Comparative Example 4).

The invention claimed is:

1. A dip-formed article obtained by dip-forming a dip-forming latex composition including:
   a dip-forming latex containing a copolymer containing 40 to 80% by weight of conjugated diene monomer units (A) containing an isoprene unit, 20 to 45% by weight of ethylenically unsaturated nitrile monomer units (B), and 2 to 15% by weight of ethylenically unsaturated acid monomer units (C), the conjugated diene monomer units (A) containing the isoprene unit and a butadiene unit at a weight ratio of 70:30 to 95:5 (isoprene unit:butadiene unit); and
   a crosslinking agent, wherein
   the dip-formed article has a tear strength of 50 N/mm or more, a tensile strength of 25 MPa or more, and an oil swelling ratio of 5% or less.

TABLE 1

| | | | Ex. 1 | Ex. 2 | Ex. 3 | Ex. 4 | Ex. 5 | Ex. 6 | Comp. Ex. 1 | Comp. Ex. 2 | Comp. Ex. 3 | Comp. Ex. 4 |
|---|---|---|---|---|---|---|---|---|---|---|---|---|
| Composition of copolymer | Isoprene unit | % by weight | 45.5 | 52.0 | 61.75 | 65.0 | 55.2 | 52.8 | 32.5 | 0.0 | 67.2 | Blend of Example 4 and Comparative Example 2 (Example 4: Comparative Example 2 = 80:20) |
| | 1,3-butadine unit | % by weight | 19.5 | 13.0 | 3.25 | 0.0 | 13.8 | 13.2 | 32.5 | 65.0 | 16.8 | |
| | Acrylonitrile unit | % by weight | 29.0 | 29.0 | 29.0 | 29.0 | 25.0 | 29.0 | 29.0 | 29.0 | 10.0 | |
| | Methacrylic acid unit | % by weight | 6.0 | 6.0 | 6.0 | 6.0 | 6.0 | 5.0 | 6.0 | 6.0 | 6.0 | |
| Isoprene unit:butadiene unit | | | 70:30 | 80:20 | 95:5 | 100:0 | 80:20 | 80:20 | 50:50 | 0:100 | 80:20 | |
| Dip-formed article | Tear strength | N/mm | 67.4 | 71.0 | 61.8 | 61.3 | 68.8 | 63.2 | 48.6 | 43.2 | 52.3 | 28.26 |
| | Tensile strength | MPa | 39.8 | 38.8 | 36.9 | 36.2 | 34.2 | 31.8 | 41.0 | 39.2 | 23.5 | 18.6 |
| | IRM903 oil swelling ratio | % | 1.4 | 1.2 | 1.8 | 1.4 | 3.4 | 1.6 | 1.6 | 0.84 | 8.2 | 11.3 |
| Evaluation | Resistance when being worn | | A | A | A | A | A | A | A | A | C | D |
| | Resistance to mechanical maintenance work | | A | A | A | A | A | A | C | C | C | D |

As indicated in Table 1, a dip-formed article obtained by dip-forming a dip-forming latex composition including a dip-forming latex containing a copolymer containing 40 to 80% by weight of conjugated diene monomer units (A) containing an isoprene unit, 20 to 45% by weight of ethylenically unsaturated nitrile monomer units (B), and 2 to 15% by weight of ethylenically unsaturated acid monomer units (C), the conjugated diene monomer units (A) containing the isoprene unit and a butadiene unit at a weight ratio of 60:40 to 100:0 (isoprene unit:butadiene unit), and a crosslinking agent, the dip-formed article having a tear strength of 50 N/mm or more, a tensile strength of 25 MPa or more, and an oil swelling ratio of 5% or less, has an excellent resistance 2. The dip-formed article according to claim 1, wherein the ethylenically unsaturated nitrile monomer units (B) are acrylonitrile units.

3. The dip-formed article according to claim 1, wherein the ethylenically unsaturated acid monomer units (C) are ethylenically unsaturated monocarboxylic acid monomer units.

4. The dip-formed article according to claim 1, wherein the ethylenically unsaturated acid monomer units (C) are methacrylic acid units.

5. The dip-formed article according to claim 1, wherein the copolymer contains other monomer units (D) other than the conjugated diene monomer units (A), the ethylenically unsaturated nitrile monomer units (B), or the ethylenically unsaturated acid monomer units (C), and a content of the other monomer units (D) is 10% by weight or less with respect to 100% by weight of total monomer units.

6. The dip-formed article according to claim 1, wherein the copolymer contains other monomer units (D) other than the conjugated diene monomer units (A), the ethylenically unsaturated nitrile monomer units (B), or the ethylenically unsaturated acid monomer units (C), and a content of the other monomer units (D) is 5% by weight or less with respect to 100% by weight of total monomer units.

7. The dip-formed article according to claim 1, wherein the copolymer is formed only of the conjugated diene monomer units (A), the ethylenically unsaturated nitrile monomer units (B), and the ethylenically unsaturated acid monomer units (C).

8. The dip-formed article according to claim 1, wherein an addition amount of the crosslinking agent in the dip-forming latex composition is from 0.01 to 5 parts by weight with respect to 100 parts by weight of a solid content in the dip-forming latex.

9. The dip-formed article according to claim 1, wherein a solid content concentration of the dip-forming latex composition is from 5 to 40% by weight.

10. The dip-formed article according to claim 1, having a thickness of 0.05 to 3 mm.

11. The dip-formed article according to claim 1, obtained by an anode coagulant dipping method.

* * * * *